Figure 1:
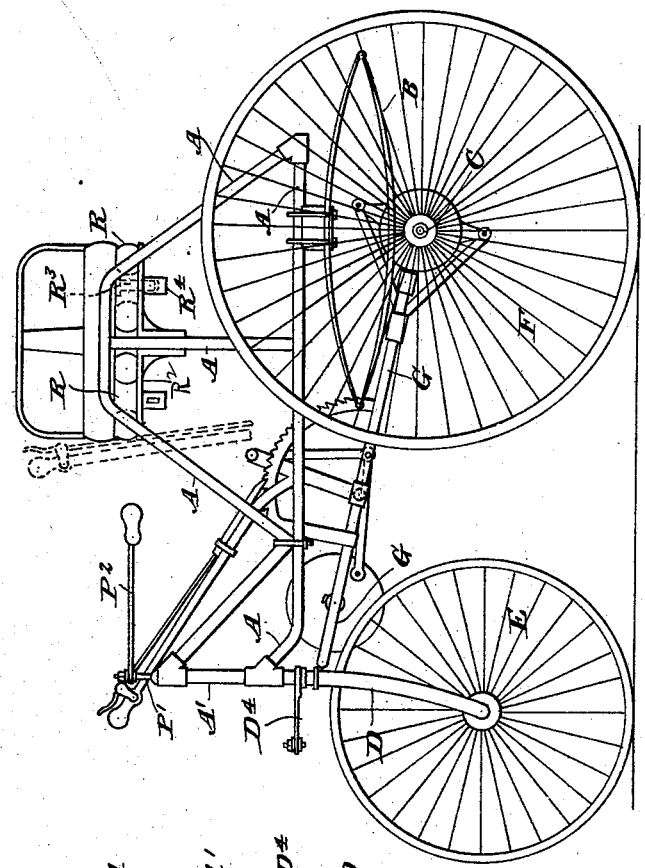

(No Model.)    J. PENDER.    3 Sheets—Sheet 1.
MOTOR CARRIAGE.

No. 601,274.    Patented Mar. 29, 1898.

WITNESSES:    INVENTOR
    John Pender
    BY
    ATTORNEYS (No Model.) 3 Sheets—Sheet 2.

J. PENDER.
MOTOR CARRIAGE.

No. 601,274. Patented Mar. 29, 1898.

WITNESSES:
C. R. Bolton

INVENTOR
John Pender
BY
Richards
ATTORNEYS (No Model.) 3 Sheets—Sheet 3.
J. PENDER.
MOTOR CARRIAGE.
No. 601,274. Patented Mar. 29, 1898.
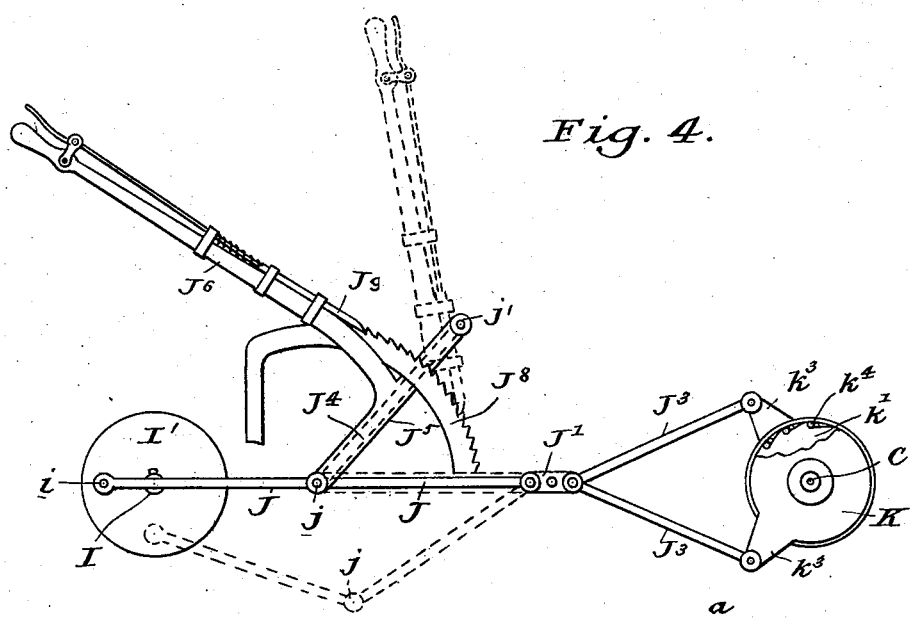
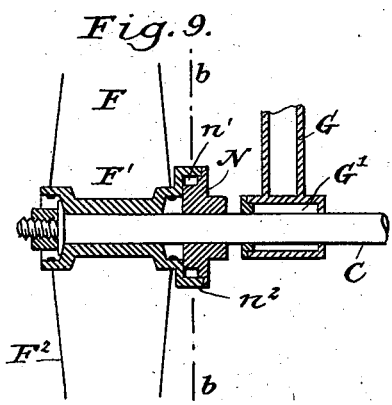
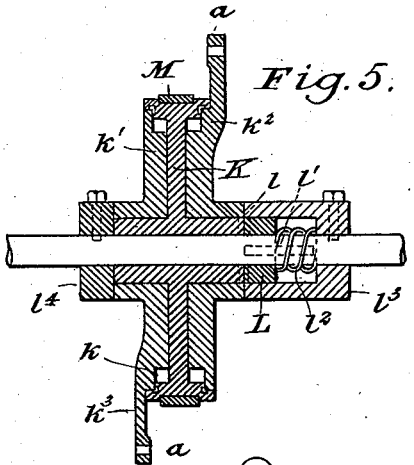
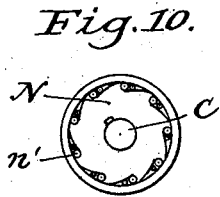
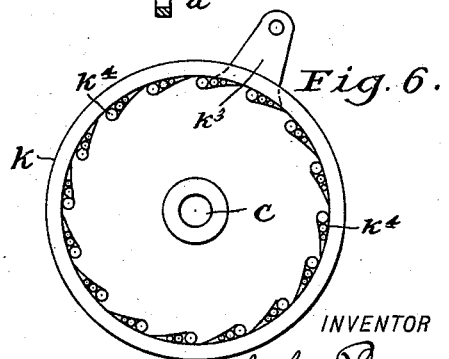
WITNESSES:
INVENTOR
John Pender
BY Richardson
ATTORNEYS
THE NORRIS PETERS CO., PHOTO-LITHO., WASHINGTON, D. C.

UNITED STATES PATENT OFFICE.

JOHN PENDER, OF BRUNSWICK, VICTORIA.

MOTOR-CARRIAGE.

SPECIFICATION forming part of Letters Patent No. 601,274, dated March 29, 1898.

Application filed December 1, 1897. Serial No. 660,361. (No model.)

*To all whom it may concern:*

Be it known that I, JOHN PENDER, horseshoe-nail manufacturer, a subject of the Queen of Great Britain and Ireland, and a resident of Tinning street, Brunswick, in the British Colony of Victoria, have invented certain new and useful Improvements in Motor Carriages, Cars, Tricycles, and other Like Power-Propelled Vehicles, of which the following is a specification.

This invention relates to motor carriages, cars, tricycles, and other like power-propelled vehicles; and it consists of the following, viz: a new and improved means for transmitting power from the driving-shaft of a motor to the driving-axle of any such vehicle, the said transmitting-gear being the means by which the speed of said driving-axle can be varied by the movement of a lever and without altering the speed of the motor; a new and improved means for connecting the hub of each driving-wheel with its axle, so as to admit of one wheel revolving faster than the other when turning around curves; an improved construction of wheel rim and tire; an improved method of mounting the frame carrying the motor and transmitting-gear, said frame being rigidly connected to the driving-axle and pivotally connected at the other end to the body-frame by a king-bolt and elastic spring, so as to practically isolate the body-frame from the vibration and jar of the motor and transmitting-gear when motor is working, also to preserve the alinement of motor-shaft, transmitting-gear, and driving-axle when passing over rough or uneven roads; an improved steering device which causes the steering-wheels to take their respective arcs of a circle when turning curves; an improved pneumatic spring-cushion or support for the seat; a novel friction-clutch for converting reciprocating into rotary motion; a novel means for supporting the body of vehicle upon an elastic seating in the post of front-wheel fork to allow of uneven ground being passed over without unnecessarily shaking the vehicle, and the several combinations and arrangements of the different parts, as hereinafter described.

My invention will now be described, aided by a reference to the attached drawings and which are to be taken as, in a sense, diagrammatic or illustrative rather than descriptive, since it will be obvious to any one that simple changes or variations can be made from what I have illustrated in the drawings which would result in the application of my improvements in many other ways to different kinds of vehicles. Moreover, it will be equally evident that certain features of my invention are capable of independent or separate use.

Similar letters will be used throughout the drawings to indicate corresponding parts.

Figure 2:
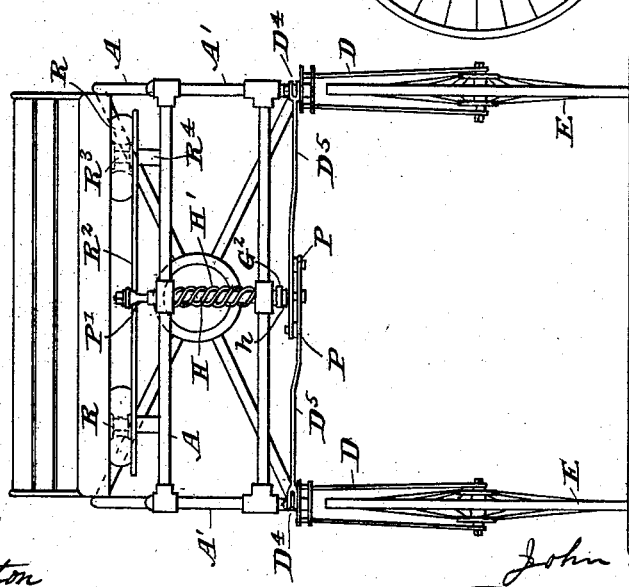
Figure 3:
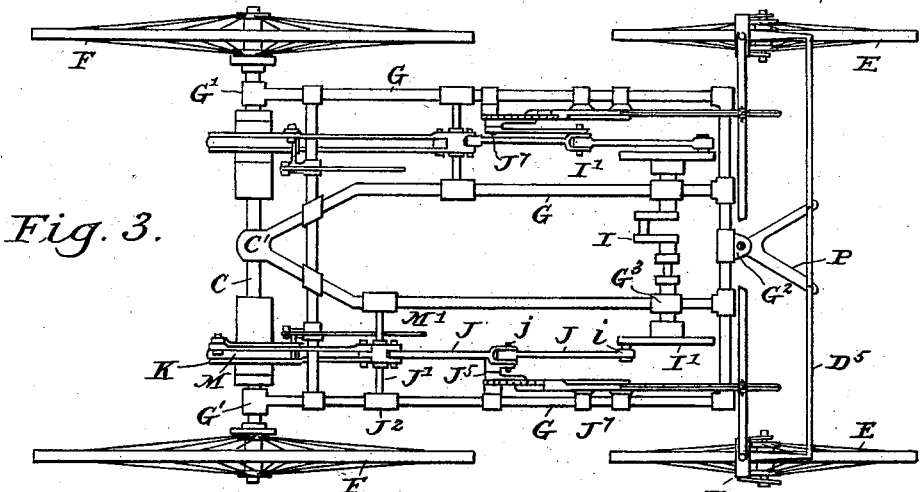
Figure 11:
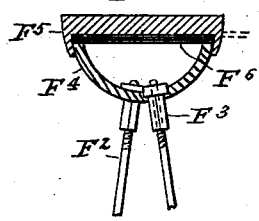
Figures 7, 8:
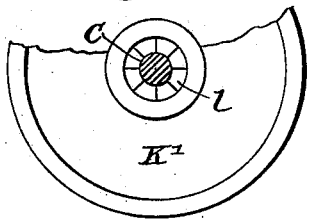
Figure 12:
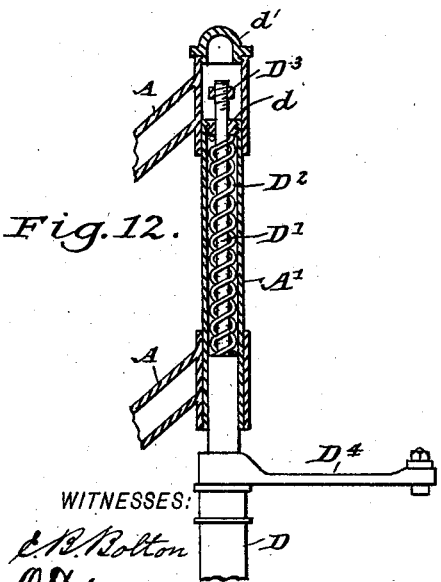
Figure 13:
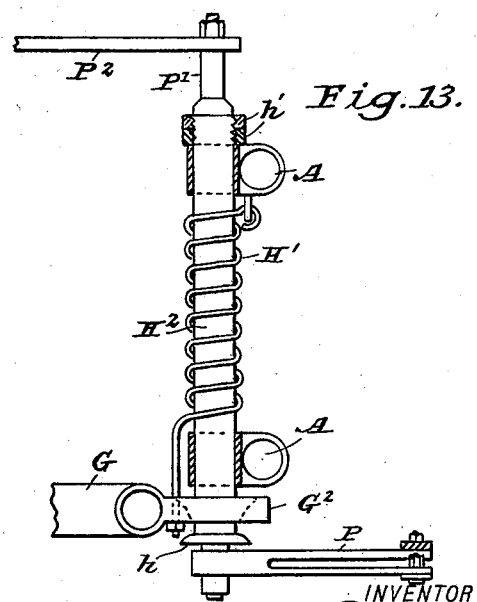

Figure 1 is a side view, and Fig. 2 a front view, of a car or carriage having the gears, frame, and several parts mounted in such a manner as to illustrate my invention; Fig. 3, a plan of the gears as arranged upon an independent frame and showing the wheels and axles; Fig. 4, a side view of the variable driving-gears; Fig. 5, a central section, and Fig. 6 a side sectional view on line $a\ a$, Fig. 5, of the friction-clutch; Fig. 7, a side view, and Fig. 8 an elevation, of the automatic saw-tooth clutch which forms the connecting medium between main clutch and axle. Fig. 9 is a section through wheel-hub and gear-frame bearing; and Fig. 10, a section on line $b\ b$, Fig. 9; Fig. 11, a section through rim of wheel; Fig. 12, a sectional view of the stem and tubular post of one of the front steering-wheels, and Fig. 13 a side view of the central steering-gear post and showing one way of suspending the front end of the isolated gear-frame.

A is the body-frame of vehicle, shown as built of tubular bars and supported at back upon springs B, mounted on axle C, and at front provided at each corner with a tubular post A′ to receive a vertical stem D′ of a fork-piece D. Both of said forks carry a steering-wheel E, while the axle C is borne by the hubs of main wheels F. G is the motor and transmission-gear frame, also built of tubular bars, as shown in Fig. 3, and said frame has three roller-bearings G′ at its back part to support it on axle C, while at its front it is furnished with a lug G², through which passes the steering-gear post H, the frame or lug being supported at its position thereon by a coiled spring H′, connected therewith and with the upper end of said spring secured to a lug on main frame A. The hole in lug G² is bell-mouthed to allow the body-frame A to sway without twisting or interfering with the alinement of the gear-frame G. Further, on lower end of post is a fixed collar $h$ to support the gear-frame in case the spring H' should be broken or any sudden jerks be imparted to the gear-frame G. The sleeve or king-post H is held in position by being passed upward through lugs on the frame A and secured in such position by lock-nuts $h'$, arranged at its upper end. The gear-frame has bearings $G^3$ on it to carry the driving-shaft I, which is driven by any suitable motor and has a crank-disk I' on both its ends. The pin $i$ on the disk at near side of vehicle is connected by two rods J with a cross-head J', said rods J being jointed together at $j$, and the ends of the cross-head have slippers $J^2$ on them to slide or work on the bars of frame G or in suitable guides thereon. Again, said cross-head is connected by rods $J^3$ with a friction driving-clutch K, arranged on axle C. The rods J are also connected at their joint $j$ with a radius-rod $J^4$, the other end of which is centered at $j'$ on the radial bar $J^5$, forming the foot of a hand-lever $J^6$, and said radius-bar $J^5$ is centered on a pin $J^7$, carried on frame G, at a position immediately in a line with the center $j$ when in the position indicated by full lines in Fig. 4. Hand-lever $J^6$ works beside a notched quadrant $J^8$, the hand-lever being provided with a spring-catch bolt $J^9$, which engages the notches of quadrant.

By moving the hand-lever from the position shown by dotted lines to the position shown in full lines in Fig. 4 varying speeds of the driving-wheel will be obtained—that is, from $nil$ to the maximum speed.

The friction driving-clutch is made up in three main parts—viz., the central rim-disk $k$ and the toothed disks $k'$ and $k^2$—the toothed disks being arranged one at each side of disk $k$ and upon its bosses, as shown in Fig. 5. Each of said toothed disks has an arm $k^3$ projecting from it, one arranged to lie above and the other below the center of shaft C. Also in the spaces between the teeth and inner surface of the rims of disk $k$ one or more metal or steel rollers or balls $k^4$ are arranged, and which are designed to frictionally grip in the forward travel of the one arm $k^3$ and in the backward travel of the other in order to impart a regular rotary motion to axle C by reason of the reciprocating motion of the cross-head J'. The rim-disk $k$ has one-half of a saw-toothed clutch $l$ formed on its boss. As shown in Fig. 7, the clutch-teeth engage with the teeth on the clutch-piece L, which works on a feather $l'$ on axle C, the teeth being held in contact by the spring $l^2$, arranged in box-collar $l^3$, while at other side of clutch is another collar $l^4$. When the carriage or car is being propelled forward, the clutch-teeth $l$ grip and drive the axle C, while if the vehicle or car moves backward the axle C can revolve without affecting the rotation of the clutch. The clutch L is to allow of the vehicle traveling backward; but in light vehicles which may only require a forward motion this clutch can be dispensed with and the central rim-disk $k$ of the friction-clutch be securely fixed to the shaft C.

M is a brake-band located in a groove on outer surface of rim-disk $k$, said brake being operated by a connecting-rod M', attached to a hand or foot lever on the vehicle.

N is the toothed part of a clutch keyed on axle C and having rollers $n'$ between its teeth and the rim $n^2$, formed on boss or hub F' of wheel F, the purpose of friction-clutch N being to allow one wheel to revolve faster than the other, such as when the vehicle is passing around a curve. This clutch can be applied independently to any power-driven vehicle for the same purpose.

$F^2$ are the wheel-spokes, secured in the hub in the ordinary manner, while their outer ends are screwed to receive square or polygonal nipples $F^3$, the heads of which fit in a countersunk recess formed at inside of a semicircular rim $F^4$, and such rim has a flanged tire $F^5$ secured on it, a leather or other insertion $F^6$ being placed in the joint to break the metallic connection and to take up any undue vibration or to act as a cushion. The tire is rolled with one of its flanges $f$ flat, as indicated by dotted lines in Fig. 11, and which flange, after the rim is in position, is turned or worked down over the side of rim to secure the two parts together.

The stem D' within each of the front corner-posts A' is enlarged at the bottom part to fit the space in post A' and to form a shoulder for a coiled spring $D^2$, the upper part of which bears under a ring $d$, secured in the post A'. Also at top end of stem D' is a nut $D^3$, and the top end of post is furnished with a cap $d'$.

$D^4$ is an arm projecting from each stem D', and these are connected by rods $D^5$, one to each arm of a double-arm piece P, secured on the lower end of a central vertical steering-rod stem $p'$, having a solid collar $p$ on it which rests on top end of and passes through a sleeve or king-post H, while the upper end of stem P' is furnished with a steering-rod $P^2$. Further, it will be observed that the rods connecting the arms $D^4$ with central two-arm piece pass to the arm farthest from the wheel which it operates. This places the wheels in such a position as to take the proper arc of a circle when turning a curve.

R are the pneumatic spring-supports for the seat of vehicle, said supports consisting of one or more air-tight annuluses arranged between the under side of cushion or seat and a rigid support $R^2$ upon vehicle, the seat being held in position by pins, as $R^3$, projecting from the under side of seat and passing into sockets $R^4$, secured to or formed on support $R^2$. Furthermore, the seats may either be arranged singly above one of the annular pneumatic cushions R or in pairs or in any other desirable manner.

By the variable-speed-transmission gear forming part of my invention the driving-motor can be kept continuously working at a regular speed and the transmission-gear so placed that any proportion of the maximum speed given by the motor be imparted to the vehicle. For instance, the full speed is given when the hand-lever is in the position indicated by the full lines in Figs. 1 and 4, or the vehicle may be brought to a standing position while the motor is still working by placing the hand-lever in the position indicated by the dotted lines in Fig. 4. In Fig. 3 I show the variable transmission-gears duplicated and arranged on the "off" side, such being employed for propelling the vehicle backward, and for this purpose the teeth of friction-clutch lie in a direction reverse to that of the forward friction driving-clutch, and these gears are controlled by an independent lever arranged on vehicle.

Having now particularly described and ascertained the nature of my said invention and in what manner the same is to be performed, I declare that what I claim in motor carriages, cars, tricycles, and other like power-propelled vehicles is—

1. A variable-speed-transmitting gear consisting of a jointed connecting-rod as J imparting motion from a crank-pin as $i$ to a reciprocating cross-head or slipper as J' said jointed rod having the position of its central joint $j$ controlled by a radius-lever as $J^4$ carried by a radial arm as $J^5$ at foot of lever as $J^6$ substantially as described and shown in Figs. 1, 3 and 4 of the drawings.

2. In combination, the frame, the driven axle, the clutch mechanism thereon, the reciprocating cross-head, connected therewith, the driving-disk, the jointed pitman J J connecting the disk and cross-head, the radial bar $J^5$ pivoted to the frame, the link $J^4$ connecting the bar $J^5$ with the joint of the pitman, the quadrant, and the hand-lever for adjusting the bar $J^5$, having a pawl engaging the quadrant, substantially as described.

3. In combination, the driving-axle and main frame, the steering-wheels having supporting-forks rotatably mounted in the main frame, the steering-rod journaled in the main frame and connected with the steering-forks for rotating the same, and the motor-supporting frame pivotally connected with the driving-axle at one end and having a plate at the other end provided with an opening adapted to engage the steering-rod, and a spring connection between the forward end of said motor-supporting frame and the main frame, substantially as described.

In witness whereof I have hereunto set my hand in presence of two witnesses.

JOHN PENDER.

Witnesses:
BEDLINGTON BODYCOMB,
GEORGE E. BODYCOMB.